Patented Aug. 4, 1925.

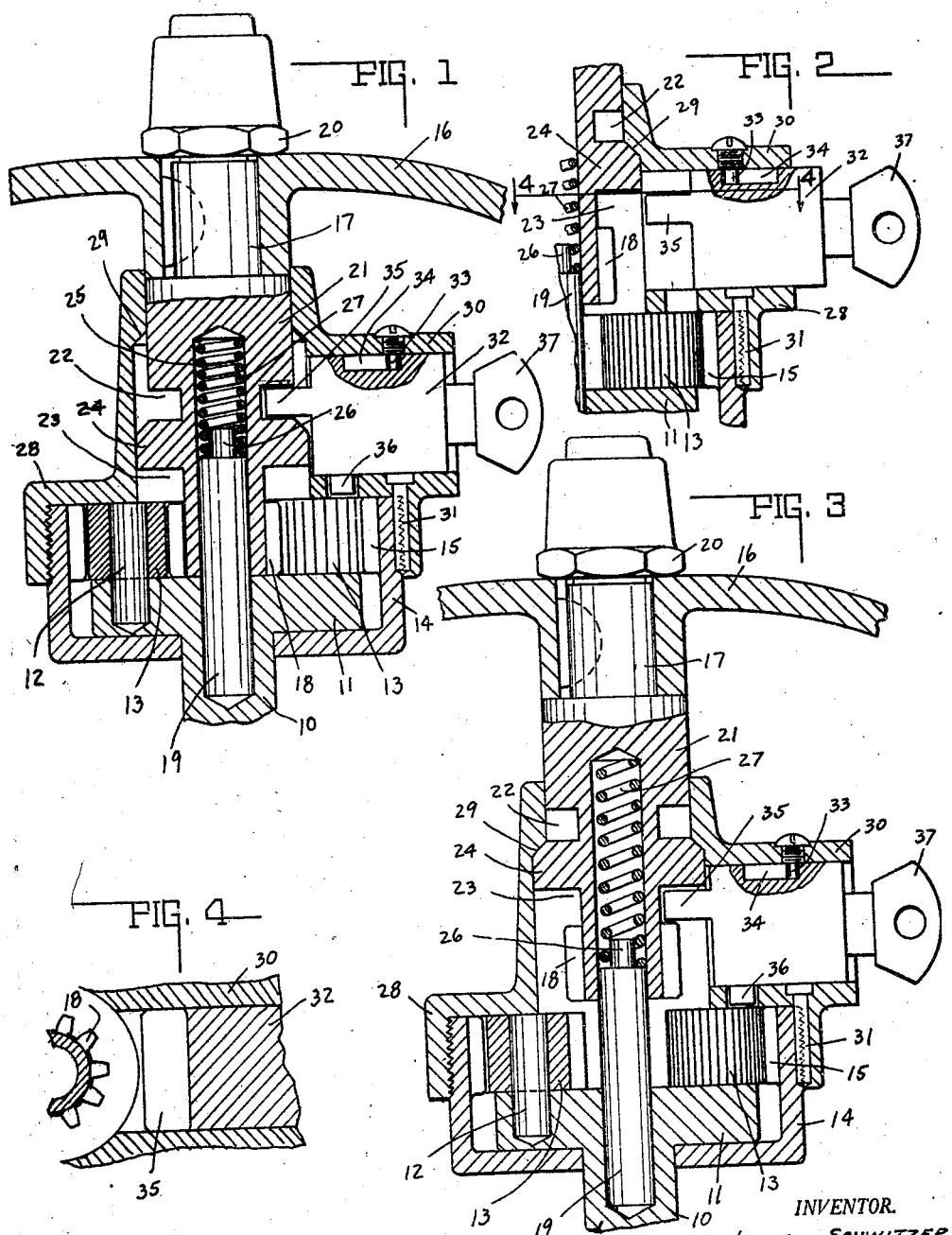

1,548,636

UNITED STATES PATENT OFFICE.

LOUIS SCHWITZER, OF INDIANAPOLIS, INDIANA, ASSIGNOR TO AUTOMOTIVE PARTS CO., OF INDIANAPOLIS, INDIANA, A CORPORATION.

STEERING-WHEEL LOCK.

Application filed April 19, 1924. Serial No. 707,607.

*To all whom it may concern:*

Be it known that I, LOUIS SCHWITZER, a citizen of the United States, and a resident of Indianapolis, county of Marion, and State of Indiana, have invented a certain new and useful Steering-Wheel Lock; and I do hereby declare that the following is a full, clear, and exact description thereof, reference being had to the accompanying drawings, in which like numerals refer to like parts.

This invention pertains to a steering wheel lock of that type which, when locked in one position, will be operative for steering purposes, and when locked in another position, will be disconnected from the steering gear so as to be freely rotatable, thereby preventing the control of the vehicle to be had. While the construction herein shown is applicable to ready installation on the steering post of Ford automobiles, the structure may be altered without departing from the invention so as to make it applicable to other types of steering posts or mechanisms.

Whereas steering wheel locks which function upon the same principle have been used for several years, it is the purpose and object of this invention to provide a structure of this character which will be fool and theft proof to a maximum degree, while at the same time of simple, sturdy and economical structure, and readily adapted for installation without altering the original parts of the steering post.

One of the important features of the invention resides in the spring means for normally retaining the wheel in inoperative position. By reason of said spring, it is necessary that the wheel be locked firmly in operative position or in inoperative position. It permits no partial locking which may result in causing a serious accident. Another important feature resides in the width of the locking tongue which gives added strength to the device in an important place.

The full nature of the invention will be understood from the accompanying drawings and the following description and claims:

In the drawings, Figure 1 is a central vertical section through the upper portion of the steering post with a locking wheel mounted thereon in operative position. Fig. 2 is the same as the right-hand part of Fig. 1, showing the lock removed for permitting the wheel to be moved to operative or inoperative position. Fig. 3 is the same as Fig. 1, showing the wheel locked in inoperative position. Fig. 4 is a section taken on the line 4—4 of Fig. 2.

In the drawings there is shown a steering post 10 provided with a head 11 on which are rotatably mounted, by means of the short pinion shafts 12, the pinions 13. There are three of said pinions mounted upon the head 11, all of which are in position to mesh and engage with the internal gear case 14 provided with internal gear teeth 15 about the inner periphery thereof for providing a planetary gear system.

The steering wheel spiders 16 are keyed to the upwardly extending spindle 17 which is adapted to rest on the head 11 and is provided on the lower end thereof with a central drive pinion 18, the shaft 19 extending downwardly into a suitable bushing in the post 10 and upwardly into a central bore through the pinion 18 for centering the same and maintaining it in proper relation with the pinions 13. The spider 16 of the steering wheel is further held in locked position upon the spindle 17 by the lock nut 20.

The structure above described is the same or substantially the same as that employed in the steering mechanism of the Ford automobile for transmitting rotary movement from the wheel through the planetary gearing to the steering post 10. In installing the lock wheel forming this invention, the original nut 20, spider 16, spindle 17, pinion 18 and shaft 19 are removed and replaced by those illustrated herein.

The spider 16 is mounted on a reduced portion of the spindle 17, which is formed integral with an enlarged body portion 21, said body portion being provided with an upper peripheral groove 22 and a lower peripheral groove 23. That portion 24 of the body portion 21 extending between said grooves is of a slightly larger diameter than the upper portion of the body. The body 21, and the pinion 18, integral with and forming a part thereof, contains a central vertical bore 25 in which the short shaft or bearing pin 19 extends from the post 10. Said bearing pin is provided at its upper end with a reduced portion 26 so as to leave a shoulder upon which the spiral spring 27 is seated, said spring being compressed between the upper end of the pin and the top of the bore so as to normally maintain the wheel in raised position. Surrounding the body portion 21 of the spindle 17 there is a housing 28 provided with an annular and downwardly extending internal threaded flange adapted to screw upon the gear case 14. Said housing is provided with an upwardly extending portion adapted to completely embrace the body portion 21 and permit said body portion to slide vertically therein, but by means of the shoulder 29 engaging the portion 24, preventing its removal. Said housing is provided with a laterally extending lock barrel portion 30 through which the pin 31 extends into a bore cut jointly into the flange of the housing and the adjacent portion of the casing for permanently pinning and locking these two members together against their being unscrewed.

Mounted in the barrel 30 there is a lock member 32 slidable therein, but limited in its movement by means of a screw 33 engaging in a longitudinal slot 34. The lock member is provided with a tongue 35 so formed as to be capable of extending into either of the annular recesses 22 or 23. On the lower side of the lock member there is a bolt 36 adapted to extend in a complementary recess formed in the housing 28 so as to prevent the sliding movement of the lock member when the bolt is extended, and permitting its sliding movement when withdrawn. A key 37, operating in the lock, is adapted to cause the bolt 36 to be withdrawn or extended into the locking position.

In installing the lock wheel, the original housing and the wheel with its associated pinion and spindle are removed, the pin 19 then being dropped into the post and the housing 28 with the wheel, spindle 17 and body portion 21 provided with the spring 27 in the bore thereof, are mounted in position upon the port 10 so that the housing may be screwed onto the casing 14. The pin 31 is then driven into place after the housing and casing have been bored to receive the same, after which the lock member 32 is installed in the barrel and the screw 33 is screwed therein.

In operation, when it is desired to lock the vehicle against theft, the key is turned so as to withdraw the bolt 36 and pull the locking member outwardly to the position shown in Fig. 2. This movement of the locking member removes the tongue 35 from engagement in the slot 22 so that the spring 27 may function to elevate the post until the portion 24 engages the shoulder 29, as shown in Fig. 3. This will cause the pinions 29 to disengage the pinions 13 so that the wheel and post 10 will be operably disconnected. The lock 32 is then pushed back so that the tongue 35 engages the lower groove 23, after which the key is turned to cause the bolt 36 to move into locking position, and the key is removed from the locking member. It will be obvious, therefore, that without the key, there will be no way in which to cause the wheel to become operably engaged with the steering post. When it is desired to bring the wheel into operative position, the key is inserted so that the lock member may be withdrawn the wheel forced down against the tension of the spring 27 into operative position, upon which the lock member is moved back so that the tongue engages the upper slot 22 and maintains the same in this position.

The invention claimed is:

1. The combination with a steering post, of a steering wheel spindle, said spindle being provided with an annular groove about the periphery thereof, means for pivotally mounting said spindle on said post, a pinion on said spindle for operatively connecting the same with said post when moved to operative position, and disconnecting the same when moved to inoperative position, a compression spring for normally maintaining said spindle in inoperative position, a housing surrounding said spindle, means on said housing for engaging an enlarged portion of said spindle and limiting the movement thereof, a casing surrounding the upper portion of said post, means for securing said housing and said casing together, a locking member mounted in said housing when in one position adapted to engage said groove for maintaining said spindle in operative position against the tension of said spring, and when in the other position to disengage the same so as to permit said spring to move the spindle to inoperative position, and means associated with said locking member for locking the same in groove engaging position.

2. The combination with a steering post, of a steering wheel spindle, said spindle being provided with annular grooves about the periphery thereof and a central bore formed therein, a pin for pivotally mounting said spindle on said post, means on said spindle for operatively connecting the same with said post when moved to operative position and disconnecting the same when moved to inoperative position, a compression spring positioned in said bore between said pin and spindle for normally maintaining said spindle in inoperative position, a housing surrounding said spindle and having a reduced portion with a shoulder near one end thereof for engaging an enlarged portion of said spindle and limiting the movement thereof, a casing surrounding the upper portion of said post, means for locking said housing and casing, a locking member slidably mounted in said housing in position to engage one of said grooves when in one position for maintaining said spindle in operative position against the tension of said spring and when in the other position to disengage the same so as to permit said spring to move the spindle to inoperative position, whereupon said member may engage the other groove for locking the spindle against return movement, and means associated with said locking member for locking the same in groove-engaging position.

In witness whereof, I have hereunto affixed my signature.

LOUIS SCHWITZER.